(12) United States Patent
Blackwood

(10) Patent No.: US 7,075,252 B1
(45) Date of Patent: Jul. 11, 2006

(54) LED DRIVER CIRCUIT

(75) Inventor: Andrew J. Blackwood, Waukesha, WI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/104,099

(22) Filed: Apr. 12, 2005

(51) Int. Cl.
*H05B 37/02* (2006.01)

(52) U.S. Cl. ...................... 315/291; 315/307

(58) Field of Classification Search ............... 315/291, 315/307, 224, 219, 200 A; 327/143, 103, 327/514, 536; 323/282
See application file for complete search history.

(56) References Cited

U.S. PATENT DOCUMENTS

| | | | | |
|---|---|---|---|---|
| 5,111,070 A | * | 5/1992 | Murphy et al. | 327/103 |
| 5,196,781 A | * | 3/1993 | Jamieson et al. | 320/102 |
| 5,539,352 A | * | 7/1996 | DuPuy | 327/514 |
| 5,821,697 A | * | 10/1998 | Weber | 315/200 A |
| 6,636,104 B1 | * | 10/2003 | Henry | 327/536 |
| 6,897,717 B1 | * | 5/2005 | Eddleman et al. | 327/543 |
| 6,949,965 B1 | * | 9/2005 | Jurgilewicz et al. | 327/143 |
| 2005/0052168 A1 | * | 3/2005 | Tazawa et al. | 323/282 |
| 2005/0057866 A1 | * | 3/2005 | Mergens et al. | 361/56 |

* cited by examiner

*Primary Examiner*—Don Wong
*Assistant Examiner*—Hung Tran Vy
(74) *Attorney, Agent, or Firm*—Martin J. Morgan

(57) ABSTRACT

An LED driver circuit that includes first and second switching mechanisms. The first mechanism is in a first switching condition when a source voltage is at or below a first threshold and moves to a second switching condition when the source exceeds the first threshold. The second mechanism is in a third switching condition when the source voltage is applied thereto and is at or below a second threshold less than the first threshold and moves to a fourth switching condition when the source voltage is applied thereto and is between the first and second thresholds. The third and fourth switching conditions each cause a safe current to flow through the LED. The second switching condition causes a safe current, preferably none, to flow through the LED, and the first switching condition causes the source voltage to be applied to the second mechanism. Also, a switching assembly including the circuit.

23 Claims, 3 Drawing Sheets

LED DRIVER CIRCUIT

BACKGROUND OF THE INVENTION

1. Field of the Invention

The present invention relates to an LED driver circuit, and in particular to a circuit for protecting an LED or similar lighting device from transient voltages in, for example, a vehicle electrical system.

2. Background Information

The instrument panel, center console and/or dashboard of a vehicle, such as an automobile or a truck, typically contains a number of switches for activating various components of the vehicle, such as, without limitation, the headlights, hazard lights and front and rear fog lights. A light emitting diode (LED) or other suitable light source is often provided in connection with each such switch in order to illuminate the area surrounding the switch assembly.

In addition, during operation of a vehicle, relatively large transient voltages may occur. These transient voltages are of relatively short duration and may result from a loose battery connection or other causes. If electrical devices on the vehicle, such as the LEDs described above, are exposed to the relatively large transient voltages, the devices could be damaged (all devices and components are on the same electrical system). LEDs used in conjunction with switch assemblies can typically have a maximum current rating on the order of 25 mADC, meaning they can only safely operate, without being damaged, at currents at or below such values. Thus, LED protection circuits have been developed for protecting LEDs from potentially damaging transient voltage spikes.

As is known, vehicles typically employ either a 12 volt or a 24 volt (larger vehicles) electrical system, and the prior art LED protection circuits that have been developed have been designed to operate only in the particular electrical system (12 volt or 24 volt) in question. FIG. 1 is a circuit diagram of LED protection circuit 5, which is one example of a prior art LED protection circuit for use in connection with a 24 volt vehicle electrical system. As seen in FIG. 1, the 24 volt electrical signal (actually, the signal may typically range from between 18 volts and 32 volts) is applied, when appropriate, across terminals 10A and 10B. LED protection circuit 5 includes resistors 15 and 20 connected in parallel, each of which is preferably a 3K Ω resistor. Zener diode 25 is provided between resistor 15 and terminal 10B, and is chosen such that it will not begin conducting current until an upper threshold voltage is reached, such as about 36 volts. Zener diode 25 may be a 39 VDC zener diode, which will typically begin to conduct at about 35–36 volts. LED 30, which is the LED to be protected by the LED protection circuit 5, is provided between resistor 20 and terminal 10B. Also, resistor 35, such as a 51 Ω resistor, is provided in series with LED 30. In operation, if an appropriate 24 volt (actually 18 volt to 32 volt) signal is applied across terminals 10A and 10B (such as when the associated switch is in an "on" position), zener diode 25 will not conduct current, and the voltage will be applied across parallel resistors 15 and 20 and LED 30. As a result, a current of about 16 mADC will flow through LED 30, which is within the operating range of LED 30. If, however, a voltage of about 36 volts or greater, as a result of a transient condition, is applied across terminals 10A and 10B, then zener diode 25 will conduct and will clamp the excess voltage down and shunt harmful current away from LED 30, thereby protecting LED 30. Resistor 35 and diode 40 are provided to protect LED 30 in the event circuit 5 is improperly connected to the voltage source (i.e., backwards).

FIG. 2 is a circuit diagram of LED protection circuit 5', which is one example of a prior art LED protection circuit for use in connection with a 12 volt vehicle electrical system. LED protection circuit 5' is identical to LED protection circuit 5, except that the values of resistor 15', resistor 20', and zener diode 25' are chosen to provide an appropriate current to LED 30 when a 12 volt (actually typically ranging from between 9 volts and 16–17 volts) signal is applied across terminals 10A and 10B, and to protect LED 30 from voltages that exceed about 18 volts. As will be appreciated, two different circuits are required, depending on the type of electrical system (12 or 24 volt) being employed. Suppliers and maintenance personnel must thus stock both types of protection circuits.

In addition, LED protection circuits such as those shown in FIGS. 1 and 2 are currently mounted to the switch assembly as shown in FIG. 3. Specifically, the LED protection circuit is implemented by attaching discrete electrical components 45 (e.g., the components shown in FIGS. 1 and 2) to a circuit board substrate material 50, such as FR-4, G-10 or the like. LED 30 is then attached to the circuit board substrate material 50 at appropriate electrical contacts. The circuit board substrate material 50 containing the LED protection circuit is then attached to a connector base 60 which forms a part of the switch assembly of the vehicle. Connector base 60 may be made of, for example, glass filled valox, and includes electrical connectors 65 for connecting the switch assembly to the vehicle electrical assembly. The problem with such a configuration is that the circuit board substrate material 50 is responsible for about a third of the price of the finished switch assembly as a whole (e.g., the circuit board substrate material 50 typically costs on the order of $0.50 with the cost of the whole switch assembly being approximately $1.50).

SUMMARY OF THE INVENTION

These needs, and others, are addressed by the present invention which provides a driver circuit for protecting an LED or similar lighting device from transient voltage conditions, wherein the LED has a maximum operating current and driver circuit has a source voltage applied thereto. The driver circuit includes a first switching mechanism having a first switching condition and a second switching condition. The first switching mechanism is in the first switching condition when the source voltage is at or below a first threshold value and moves to the second switching condition when the source voltage exceeds the first threshold value. The driver circuit also includes a second switching mechanism having a third switching condition and a fourth switching condition. The second switching mechanism is in the third switching condition when the source voltage is applied thereto and is at or below a second threshold value that is less than the first threshold value and moves to the fourth switching condition when the source voltage is applied thereto and exceeds the second threshold value and is at or below the first threshold value. The third switching condition causes a first current that is less than the maximum operating current to flow through the LED, and the fourth switching condition causes a second current that is less than the maximum operating current to flow through the LED. In addition, the second switching condition of the first switching mechanism causes a safe level of current, preferably substantially none, to flow through the LED and preferably prevents the source voltage from being applied to the second switching mechanism (thereby protecting the LED from transients), and the first switching condition of the first switching mechanism causes the source voltage to be applied to the second switching mechanism in order to power the LED. In one embodiment, the first and second currents are substantially equal to one another such that the LED generates substantially the same amount of light in each condition.

Preferably, the first switching mechanism and the second switching mechanism are provided on a single integrated circuit. In addition, the second switching mechanism preferably includes a parallel resistor combination including a first resistor in parallel with a second resistor, wherein when the second switching mechanism is in the third switching condition the source voltage is applied to a first series connection including the LED connected in series with the parallel resistor combination, and wherein when the second switching mechanism is in the fourth switching condition the source voltage is applied to a second series connection including the LED connected in series with the first resistor and not the second resistor. This configuration ensures that a safe current is supplied to the LED. In order to operate with both 12 volt and 24 volt vehicle electrical systems, the first threshold value may about 36 volts and the second threshold value may be about 17 volts.

In addition, a further aspect of the invention relates to switch assembly for a vehicle electrical system including a connector base having a plurality of electrical connectors for connecting the switch assembly to the vehicle electrical system, an LED having a maximum operating current, and a driver circuit in the various embodiments described above that is electrically connected to the LED for protecting the LED from transient voltage conditions present in the vehicle electrical system. The driver circuit is electrically connected to one or more of the electrical connectors and has a source voltage from the vehicle electrical system applied thereto. Preferably, all or part of the driver circuit is provided on a single integrated circuit mounted on the connector base.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 4:
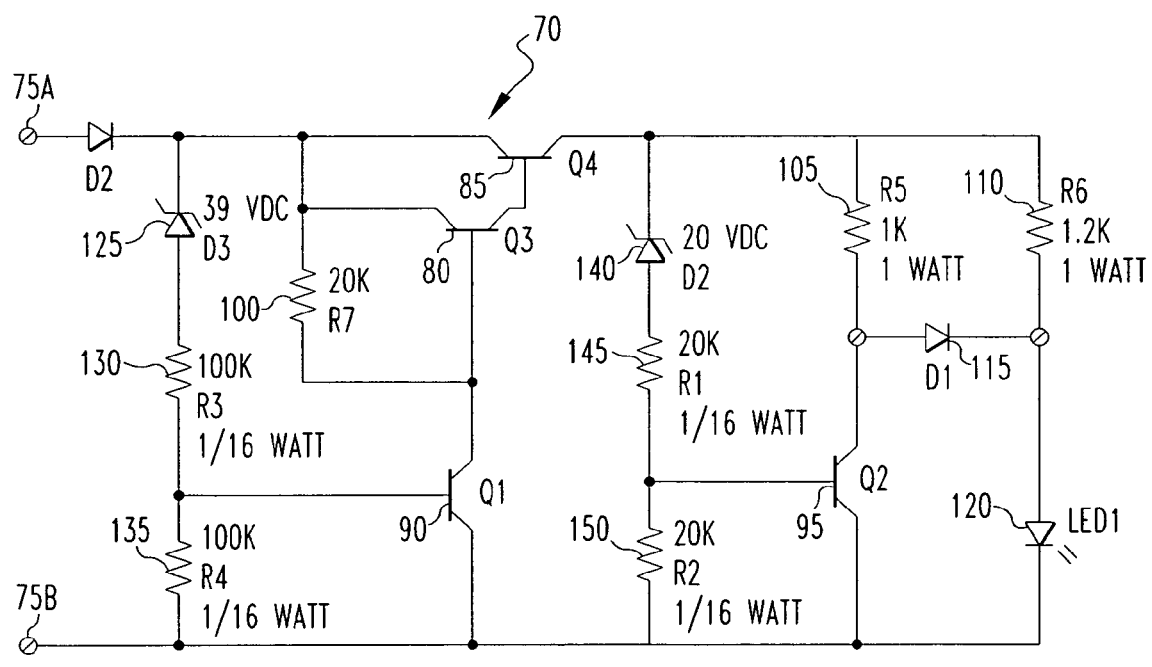
FIG. 4 is an LED protection circuit (driver circuit) according to an embodiment of the present invention.

FIG. 4 is a circuit diagram of LED protection circuit 70 according to one embodiment of the present invention that may be used interchangeably in connection with either a 12 volt or a 24 volt vehicle electrical system. Preferably, LED protection circuit 70 is implemented in the form of an integrated circuit (IC) (as opposed to discrete electrical components) according to one of several methods known in the art. LED protection circuit 70 includes pins 75A and 75B across which the electrical system voltage (12 or 24 volts) is applied. As seen in FIG. 4, LED protection circuit 70 includes four bipolar junction transistors 80, 85, 90, and 95. Resistor 100, preferably a 20K Ω resistor, is provided between the collector and the base of transistor 80. In addition, resistor 100 and the collector of transistor 80 are connected to pin 75A as shown. The emitter of transistor 80 is connected to the base of transistor 85. The collector of transistor 85 is connected to pin 75A and the emitter of transistor 85 is connected to resistors 105 and 110 provided in parallel as shown. Preferably, resistor 105 is a 1K Ω, 1 Watt resistor and resistor 110 is a 1.2K Ω, 1 Watt resistor. Diode 115 is provided between the opposite ends of resistors 105 and 110. LED 120 is provided between the junction of resistor 110 and diode 115 on one end and pin 75B on the other end. Zener diode 125, resistor 130 and resistor 135 are provided in series between pins 75A and 75B as shown in FIG. 4. Preferably, zener diode 125 is a 39 VDC zener diode and resistors 125 and 130 are 100K Ω resistors. The base of transistor 90 is connected at a location between resistor 130 and resistor 135, the collector of transistor 90 is connected to the base of transistor 80, and the emitter of transistor 90 is connected to pin 75B. As also shown in FIG. 4, zener diode 140, resistor 145 and resistor 150 are provided in series between the emitter of transistor 85 and pin 75B. Preferably, zener diode 140 is a 20 VDC zener diode and resistors 145 and 150 are 20K Ω resistors. Finally, the base of transistor 95 is connected to a location between resistor 145 and resistor 150, the collector of transistor 95 is connected to the junction of resistor 105 and diode 115, and the emitter of transistor 95 is connected to pin 75B.

In operation, when 12 volts from a vehicle electrical system (the voltage will actually range from between about 9 and 16–17 volts) is applied across pins 75A and 75B, zener diode 125 will not conduct (the voltage is not high enough), and, as a result, transistor 90 will be in a switched off (non-conducting) condition. The 12 volt signal will be applied to resistor 100, thereby causing approximately 11.3 VDC volts to be applied to the base of transistor 80. This voltage will cause transistor 80 to be switched on, which in turn will result in about 10.7 VDC to be applied to base of transistor 85 and thereby cause transistor 85 to be switched on. With transistor 85 turned on (conducting current from collector to emitter), the 12 volt signal is applied to the junction of the emitter of transistor 85 and zener diode 140. The 12 volts is not, however, sufficient to cause zener diode 140 to conduct, and, as a result, transistor 95 is in a switched off condition (no voltage is applied to its base). The 12 volt signal is thus applied to the parallel combination of resistors 105 and 110, thereby causing approximately 20 mADC (a safe level) to flow through LED 120. When 24 volts from a vehicle electrical system (the voltage will actually range from between about 18 and 32 volts) is applied across pins 75A and 75 B, zener diode 125 will still not conduct (the voltage is not high enough), and transistor 90 will be in a switched off condition. As described above, the 24 volt signal will be applied to resistor 100, thereby causing transistors 80 and 85 to be switched on. With transistor 85 turned on and conducting current from collector to emitter, the 24 volt signal is applied to the junction of the emitter of transistor 85 and zener diode 140. The 24 volts, unlike the 12 volts, is sufficient to cause zener diode 140 to conduct, and, as a result, approximately 0.7 volts is applied to the base of transistor 95 causing it to be switched on and conduct from collector to emitter. With transistor 95 turned on, current flow is shunted away from LED 120, with the resulting current flowing through LED 120 through resistor 110 being about 22 mADC (a safe level). Because substantially the same amount of current is passed through LED 120 in either situation just described (20 mADC and 22 mADC), the LED 120 will generate substantially the same amount of light in each case. If, however, a transient voltage spike exceeding, for example, 36 volts is applied across pins 75A and 75, zener diode 125 will conduct, and a voltage of approximately 0.7 volts will be applied to the base of transistor 90. As a result, transistor 90 will be turned on and will conduct current form its collector to its emitter. This condition will result in no voltage being applied to the base of transistor 80, thereby causing it and transistor 85 to be in an off, non-conducting condition. LED 120 is thus protected from the harmful transient voltage, as substantially no current will flow through it in this condition. Alternatively, the circuit may be arranged to provide only a safe level of current to flow through LED 120 under transient voltage conditions. As will be appreciated, LED protection circuit 70 may be used to provide protection to LEDs from transients in both 12 volt and 24 volt electrical system vehicles.

In the LED protection circuit 70, zener diode 125 and transistor 80, 85, and 90 form part of a first switching mechanism that allows safe level source voltages to be applied to the remainder of the circuit to provide a current for LED 120 in a first switching condition, shunts away harmful level source voltages (and prevents them from being applied to the remainder of the circuit) in a second switching condition. In addition, when the safe level voltages are applied to the remainder of the circuit, zener diode 140 and transistor 95 act as a second switching mechanism that causes a safe (below the maximum operating current) current to flow through the LED 120 regardless of the actual voltage level of the source voltage (e.g., 12 volts or 24 volts).

Figure 5:
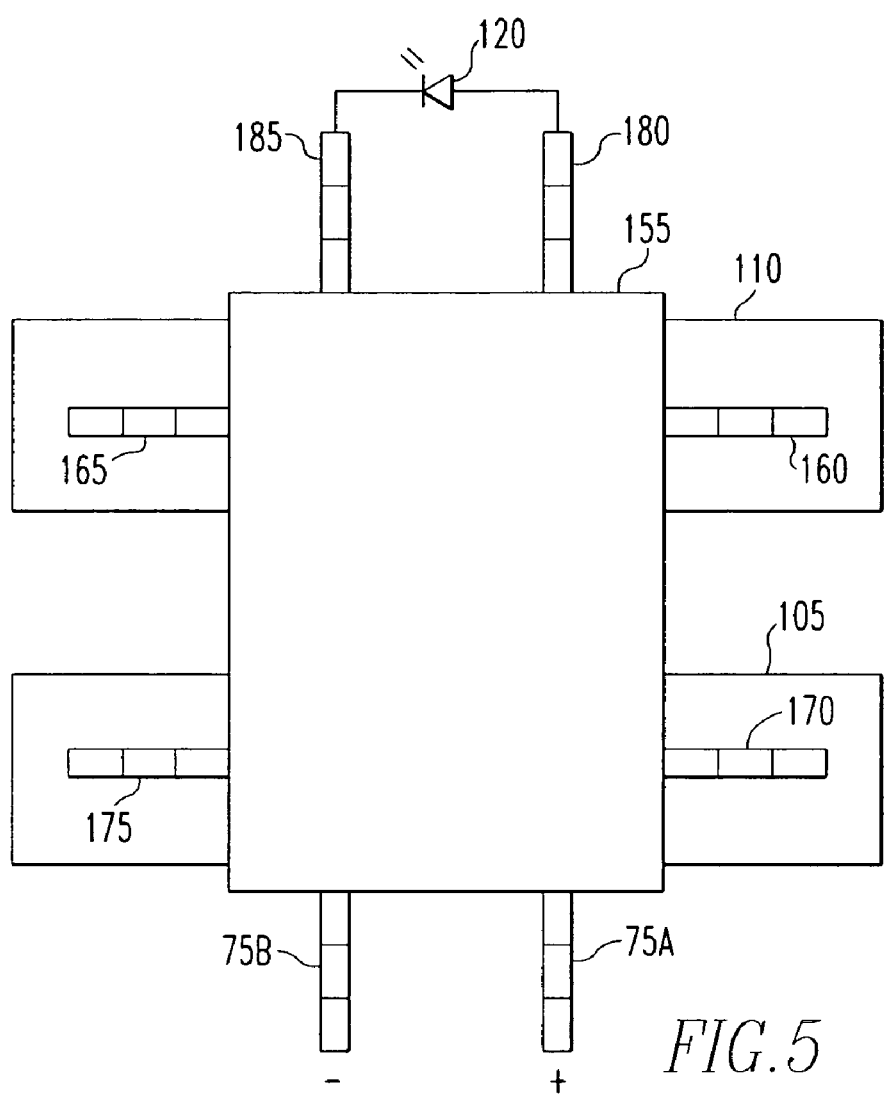
FIGS. 5 and 6 are top and front schematic views of an LED protection circuit (driver circuit) formed at least partially on an integrated circuit according to one embodiment of the present invention.
Figure 6:
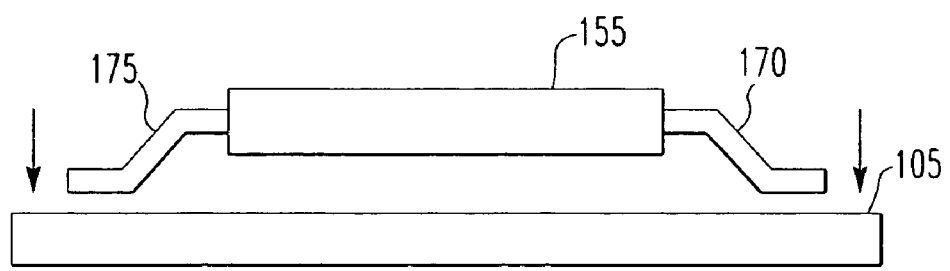

As noted above, all of the circuit elements shown in FIG. 4 except for LED 120 are, in one embodiment, provided on a single integrated circuit by known methods of IC fabrication. In another embodiment, resistors 105 and 110 are too large to be integrated into the integrated circuit and therefore are not provided on the integrated circuit, but instead are connected to the integrated circuit externally, for example as shown in FIGS. 5 and 6. In particular, FIGS. 5 and 6 show integrated circuit package 155 having leads 160, 165, 170 and 175. FIGS. 5 and 6 also show resistors 105 and 110, each in the form of a resistor package, that are external to integrated circuit package 155. Lead 160 is connected at one end to resistor 110 and at the other end to diode 115 within integrated circuit package 155 (See FIG. 4). Lead 165 is connected at one end to resistor 110 and at the other end to resistor 105 and the emitter of transistor 85 within integrated circuit package 155 (See FIG. 4). Lead 170 is connected at one end to resistor 105 and at the other end to diode 115 within integrated circuit package 155 (See FIG. 4). Lead 175 is connected at one end to resistor 105 and at the other end to resistor 110 and the emitter of transistor 85 within integrated circuit package 155 (See FIG. 4). In addition, leads 180 and 185 are provided for connecting LED 120 to integrated circuit package 155 in the manner shown in FIG. 4 (the opposite end of lead 180 is connected to the junction of diode 115 and resistor 110, and the opposite end of lead 185 is connected to pin 75B).

Figure 1:
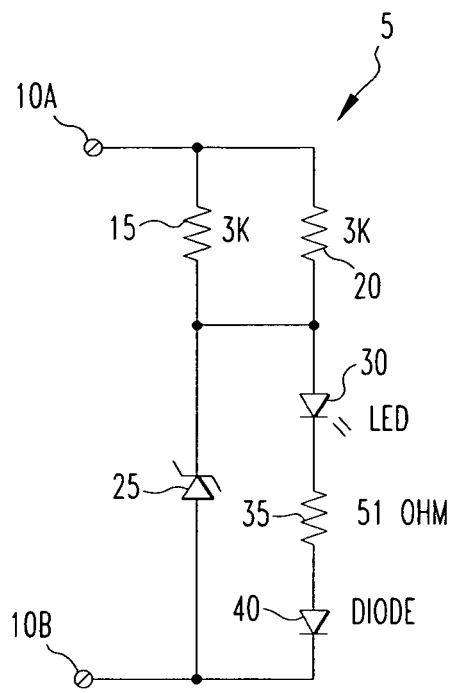
FIGS. 1 and 2 are circuit diagrams of prior art LED protection circuits.
Figure 2:
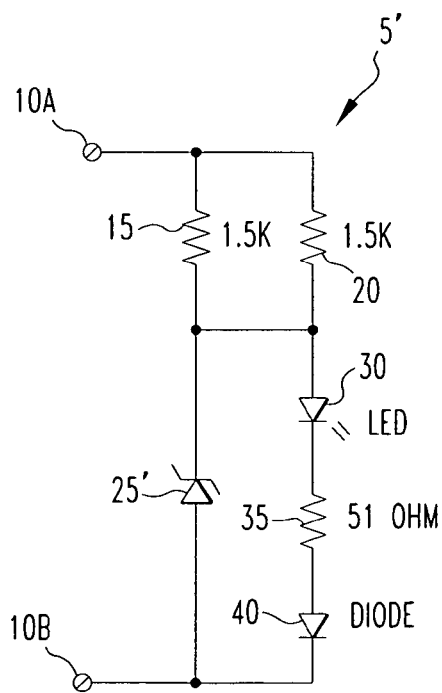
Figure 3:
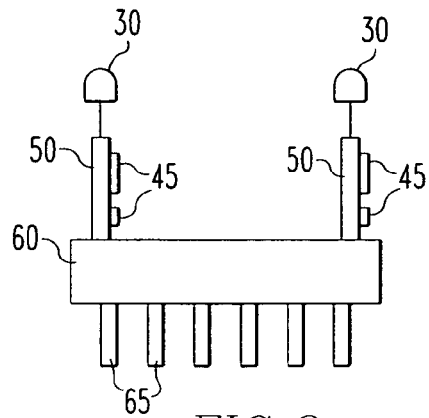
FIG. 3 is a front schematic view of a portion of prior art switch assembly that includes an LED and an LED protection circuit provided on a printed circuit board.
Figure 7:
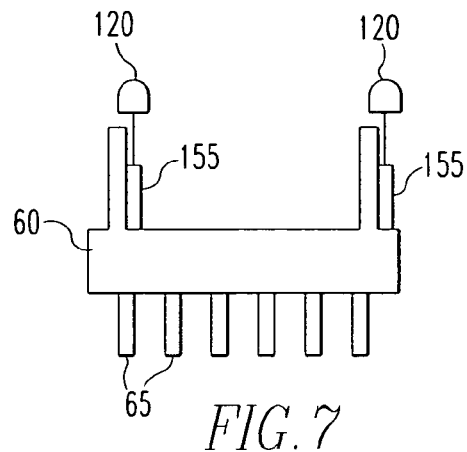
FIG. 7 is a front schematic view of a portion of switch assembly according to an aspect of the present invention that includes an LED and an LED protection circuit formed at least partially on an integrated circuit.

According to an aspect of the invention, as shown in FIG. 7, one or more integrated circuit packages 155 (with internal or external resistors 105 and 110) containing LED protection circuits 70 are mounted directly to a connector base 60 which forms a part of a switch assembly of the vehicle in question, thereby eliminating the circuit board substrate material 55 (and the associated cost) that was required in the prior art as shown in FIG. 3. Appropriate electrical connections are made to the vehicle electrical system via pins 75A and 75B, which are connected to the appropriate electrical connectors 65. One or more LEDs 120 may then be connected to the integrated circuit packages 155, with the LEDs 120 being protected by the LED protection circuits 70 provided therein.

While specific embodiments of the invention have been described in detail, it will be appreciated by those skilled in the art of various modifications and alternatives to those details could be developed in light of the overall teachings of the disclosure. For example, while the present invention has been described in connection with the supply of current to an LED, other types of similar devices for providing an indicator, a display or a light may be used, referred to herein as lighting devices. Accordingly, the particular arrangements disclosed are meant to be illustrative only and not limiting as to the scope of the invention which is to be given the full breadth of the claims appended and any and all equivalents thereof.

What is claimed is:

1. A driver circuit for protecting an LED from transient voltage conditions, said LED having a maximum operating current, said driver circuit having a source voltage applied thereto, comprising:
   a first switching mechanism having a first switching condition and a second switching condition, said first switching mechanism being in said first switching condition when said source voltage is at or below a first threshold value and moving to said second switching condition when said source voltage exceeds said first threshold value; and
   a second switching mechanism having a third switching condition and a fourth switching condition, said second switching mechanism being in said third switching condition when said source voltage is applied thereto and is at or below a second threshold value that is less than said first threshold value and moving to said fourth switching condition when said source voltage is applied thereto and exceeds said second threshold value and is at or below said first threshold value, wherein said third switching condition causes a first current to flow through said LED, said first current being less than said maximum operating current, and wherein said fourth switching condition causes a second current to flow through said LED, said second current being less than said maximum operating current;
   wherein said second switching condition of said first switching mechanism causes a current less than said maximum operating current to flow through said LED, and said first switching condition of said first switching mechanism causes said source voltage to be applied to said second switching mechanism.

2. The driver circuit according to claim 1, wherein said second switching condition of said first switching mechanism causes substantially no current to flow through said LED and prevents said source voltage from being applied to said second switching mechanism.

3. The driver circuit according to claim 1, wherein said first switching mechanism and second switching mechanism are provided on a single integrated circuit.

4. The driver circuit according to claim 1, wherein said second switching mechanism includes a parallel resistor combination including a first resistor in parallel with a second resistor, wherein when said second switching mechanism is in said third switching condition said source voltage is applied to a first series connection including said LED connected in series with said parallel resistor combination, and wherein when said second switching mechanism is in said fourth switching condition said source voltage is applied to a second series connection including said LED connected in series with said first resistor and not said second resistor.

5. The driver circuit according to claim 4, wherein said first threshold value is about 36 volts and said second threshold value is about 17 volts.

6. The driver circuit according to claim 5, wherein said first resistor comprises a 1.2K Ω, 1 Watt resistor and said second resistor comprises a 1 K Ω, 1 Watt resistor.

7. The driver circuit according to claim 1, wherein said first threshold value is about 36 volts and said second threshold value is about 17 volts.

8. The switch assembly according to claim 1, wherein said second switching condition of said first switching mechanism causes substantially no current to flow through said LED and prevents said source voltage from being applied to said second switching mechanism.

9. The driver circuit according to claim 1, wherein said first current and said second current are substantially equal to one another.

10. A switch assembly for a vehicle electrical system, comprising:
a connector base having a plurality of electrical connectors for connecting the switch assembly to the vehicle electrical system;
an LED having a maximum operating current; and
a driver circuit electrically connected to said LED, said driver circuit protecting said LED from transient voltage conditions present in said vehicle electrical system, said driver circuit being electrically connected to one or more of said electrical connectors and having a source voltage from said vehicle electrical system applied thereto, said driver circuit including:
a first switching mechanism having a first switching condition and a second switching condition, said first switching mechanism being in said first switching condition when said source voltage is at or below a first threshold value and moving to said second switching condition when said source voltage exceeds said first threshold value; and
a second switching mechanism having a third switching condition and a fourth switching condition, said second switching mechanism being in said third switching condition when said source voltage is applied thereto and is at or below a second threshold value that is less than said first threshold value and moving to said fourth switching condition when said source voltage is applied thereto and exceeds said second threshold value and is at or below said first threshold value, wherein said third switching condition causes a first current to flow through said LED, said first current being less than said maximum operating current, and wherein said fourth switching condition causes a second current to flow through said LED, said second current being less than said maximum operating current;
wherein said second switching condition of said first switching mechanism causes a current less than said maximum operating current to flow through said LED, and said first switching condition of said first switching mechanism causes said source voltage to be applied to said second switching mechanism.

11. The switch assembly according to claim 10, wherein said driver circuit is provided on a single integrated circuit mounted on said connector base.

12. The switch assembly according to claim 10, wherein said second switching mechanism includes a parallel resistor combination including a first resistor in parallel with a second resistor, wherein when said second switching mechanism is in said third switching condition said source voltage is applied to a first series connection including said LED connected in series with said parallel resistor combination, and wherein when said second switching mechanism is in said fourth switching condition said source voltage is applied to a second series connection including said LED connected in series with said first resistor and not said second resistor.

13. The switch assembly according to claim 12, wherein said first switching mechanism and all of said second switching mechanism other than said first resistor and said second resistor are provided on a single integrated circuit mounted on said connector base, and wherein said first resistor and said second resistor are external to and electrically connected to said integrated circuit.

14. The switch assembly according to claim 12, wherein said first threshold value is about 36 volts and said second threshold value is about 17 volts.

15. The driver circuit according to claim 14, wherein said first resistor comprises a 1.2K Ω, 1 Watt resistor and said second resistor comprises a 1 K Ω, 1 Watt resistor.

16. The driver circuit according to claim 10, wherein said first threshold value is about 36 volts and said second threshold value is about 17 volts.

17. The switch assembly according to claim 10, wherein said first current and said second current are substantially equal to one another.

18. A driver circuit for protecting a lighting device from transient voltage conditions, said lighting device having a maximum operating current, said driver circuit having a source voltage applied thereto, comprising:
a first switching mechanism having a first switching condition and a second switching condition, said first switching mechanism being in said first switching condition when said source voltage is at or below a first threshold value and moving to said second switching condition when said source voltage exceeds said first threshold value; and
a second switching mechanism having a third switching condition and a fourth switching condition, said second switching mechanism being in said third switching condition when said source voltage is applied thereto and is at or below a second threshold value that is less than said first threshold value and moving to said fourth switching condition when said source voltage is applied thereto and exceeds said second threshold value and is at or below said first threshold value, wherein said third switching condition causes a first current to flow through said lighting device, said first current being less than said maximum operating current, and wherein said fourth switching condition causes a second current to flow through said lighting device, said second current being less than said maximum operating current;

wherein said second switching condition of said first switching mechanism causes a current less than said maximum operating current to flow through said lighting device, and said first switching condition of said first switching mechanism causes said source voltage to be applied to said second switching mechanism.

19. The driver circuit according to claim 18, wherein said second switching condition of said first switching mechanism causes substantially no current to flow through said lighting device and prevents said source voltage from being applied to said second switching mechanism.

20. The driver circuit according to claim 18, wherein said first switching mechanism and second switching mechanism are provided on a single integrated circuit.

21. The driver circuit according to claim 18, wherein said second switching mechanism includes a parallel resistor combination including a first resistor in parallel with a second resistor, wherein when said second switching mechanism is in said third switching condition said source voltage is applied to a first series connection including said lighting device connected in series with said parallel resistor combination, and wherein when said second switching mechanism is in said fourth switching condition said source voltage is applied to a second series connection including said lighting device connected in series with said first resistor and not said second resistor.

22. The driver circuit according to claim 18, wherein said first threshold value is about 36 volts and said second threshold value is about 17 volts.

23. The driver circuit according to claim 18, wherein said first current and said second current are substantially equal to one another.

* * * * *